United States Patent
Chu

(10) Patent No.: US 6,637,292 B2
(45) Date of Patent: Oct. 28, 2003

(54) FOLDABLE BICYCLE PEDAL CRANK

(76) Inventor: Yu-Hsueh Chu, No. 15, Lane 93, Hoching Street, Taipei (TW)

( * ) Notice: Subject to any disclaimer, the term of this patent is extended or adjusted under 35 U.S.C. 154(b) by 35 days.

(21) Appl. No.: 09/942,196

(22) Filed: Aug. 28, 2001

(65) Prior Publication Data

US 2003/0041689 A1 Mar. 6, 2003

(51) Int. Cl.[7] .................................................. G05G 1/14
(52) U.S. Cl. ..................... 74/594.7; 74/594.1; 74/594.4
(58) Field of Search ............................ 74/594.7, 594.1, 74/594.4; 280/294; 403/321, 322.1, 324, 325

(56) References Cited

U.S. PATENT DOCUMENTS

| 599,978 | A | * | 3/1898 | Tanner | 74/594.7 |
| 2,384,139 | A | * | 9/1945 | Schwinn | 74/594.7 |
| 4,440,414 | A | * | 4/1984 | Wang | 280/287 |
| 4,842,292 | A | * | 6/1989 | Wang | 280/287 |
| 6,354,618 | B1 | * | 3/2002 | Liao | 280/287 |

FOREIGN PATENT DOCUMENTS

| DE | 29712100 U1 | * | 9/1997 | ............ B62M/3/08 |
| JP | 02127184 A | * | 5/1990 | ............ B62M/3/08 |
| JP | 07144677 A | * | 6/1995 | ............ B62M/3/08 |

* cited by examiner

Primary Examiner—David A. Bucci
Assistant Examiner—Justin Stefanon
(74) Attorney, Agent, or Firm—Pro-Techtor International Services

(57) ABSTRACT

A foldable bicycle pedal crank, comprising a crank, a crank endpiece, a lock, and a pedal. The crank has a connecting yoke, passed through by a first crank hole and second crank holes which aim across an indentation thereof. The crank endpiece has an insertion part that is inserted in the indentation, with a first hole, second holes and a third hole passing through the insertion part. The lock further comprises a lock body, at least one first bolt and second bolts. The first and second bolts have outer ends connected with the lock body. The first bolt further has an inner end and is hollow, enclosing a space that towards the inner end is limited by a step and accommodates a rod. The rod has a far end that passes through the inner end of the first bolt and is fixed. A spring surrounds the rod, leaning against the step. The pedal is connected with the crank endpiece.

30 Claims, 5 Drawing Sheets

FOLDABLE BICYCLE PEDAL CRANK

BACKGROUND OF THE INVENTION

1. Field of the Invention

The present invention relates to a foldable bicycle pedal crank, particularly to a foldable bicycle pedal crank that is folded quickly and conveniently allowing maximum use of space.

2. Description of Related Art

Bicycles have been a traditional means of moving and in addition have become a modern tool of sports and leisure, enhancing quality of life. Therefore, bicycles are popular today. For convenience at home as well as on travel, bicycle volumes have been shrunk. Most importantly, foldable bicycles have been developed, allowing to transport bicycles in cars for increased flexibility. After folding a bicycle, each folded part needs to take as much advantage of space as possible to minimize volume. Still, pedals mounted on cranks extending outward on both sides of the bicycle are difficult to fold by 180 degrees to take advantage of the space between the cranks and the bicycle frame, so conventional designs have the pedals stand up or point down. Standing pedals, however, are placed outside of the cranks, increasing width of the folded bicycle, while pedals that point down extend downward, not fully taking advantage of empty space within the bicycle frame. Furthermore, for folding a conventional foldable bicycle, often a tool is needed, making folding the bicycle awkward and complicated.

SUMMARY OF THE INVENTION

It is the main object of the present invention to provide a foldable bicycle pedal crank which allows to take considerable advantage of space and to fold the pedal at an optimum location for minimizing the volume of the folded bicycle.

Another object of the present invention is to provide a foldable bicycle pedal crank which allows to fold away the pedal simply, precisely and fast.

A further object of the present invention is to provide a foldable bicycle pedal crank which is novel, being different from foldable bicycle pedal cranks currently used.

The present invention can be more fully understood by reference to the following description and accompanying drawings.

DETAILED DESCRIPTION OF THE PREFERRED EMBODIMENT

Figure 1:
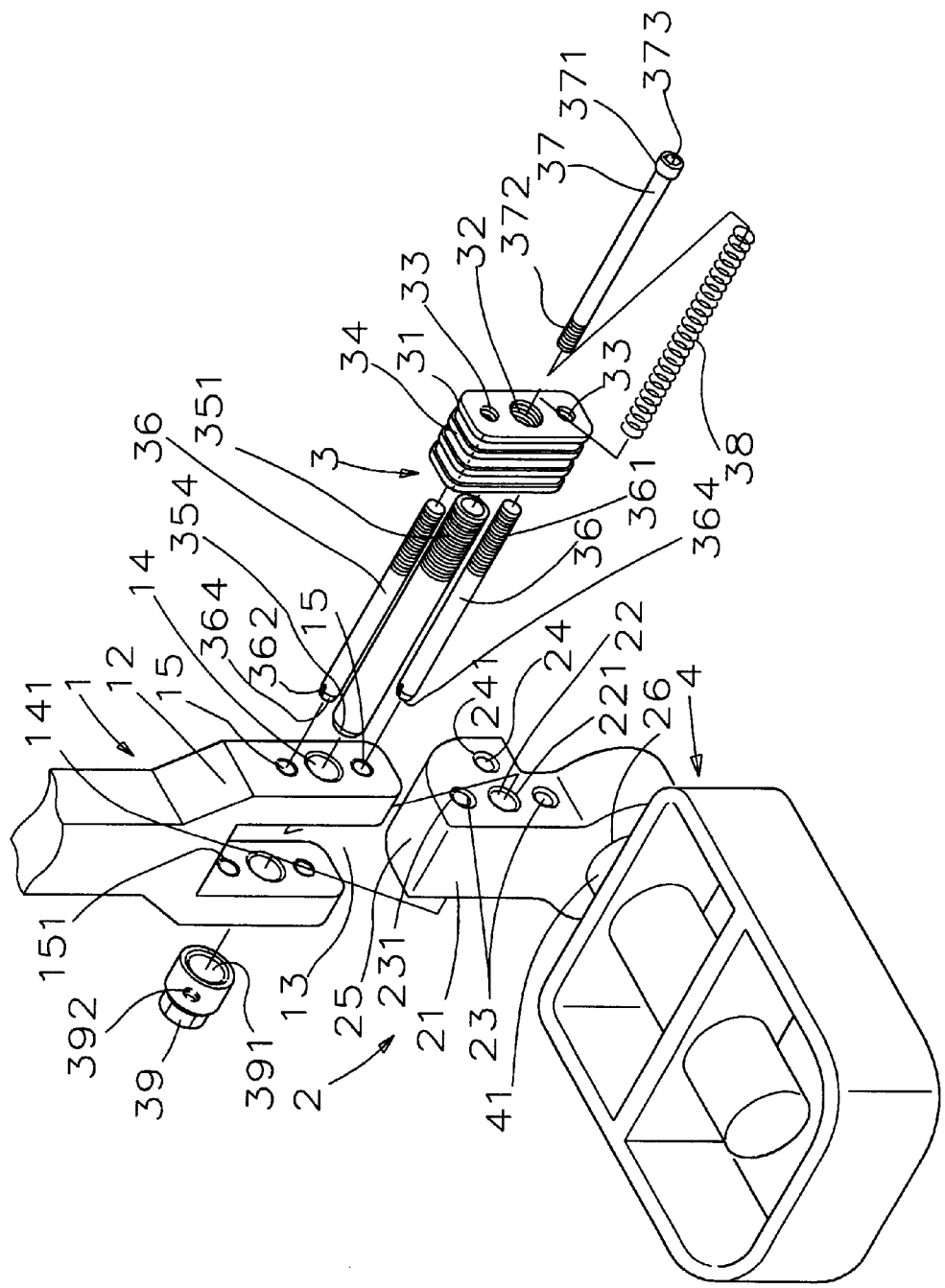
FIG. 1 is an exploded perspective view of the foldable bicycle pedal crank of the present invention.
Figure 2:
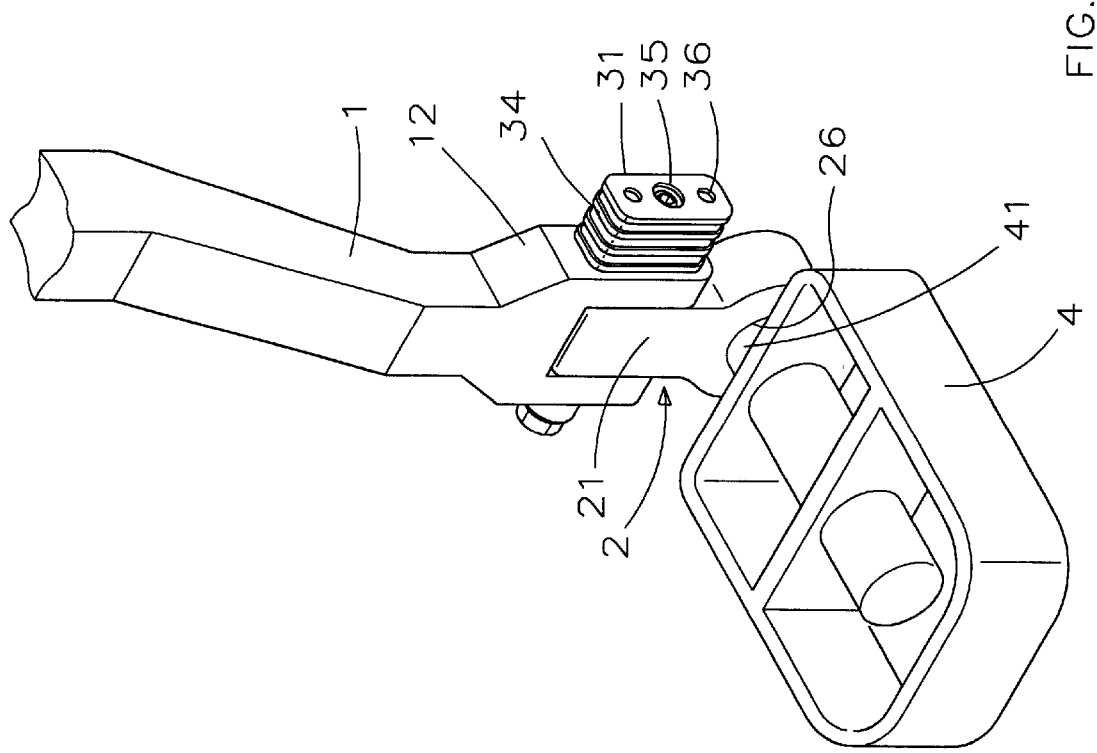
FIG. 2 is a perspective view of the foldable bicycle pedal crank of the present invention when assembled.
Figure 3:
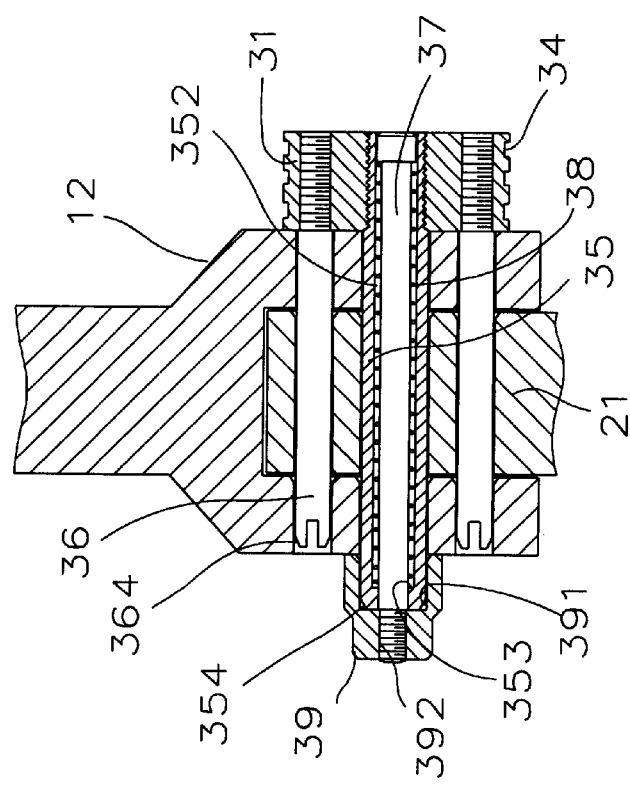
FIG. 3 is a sectional side view of the present invention.
Figure 5:
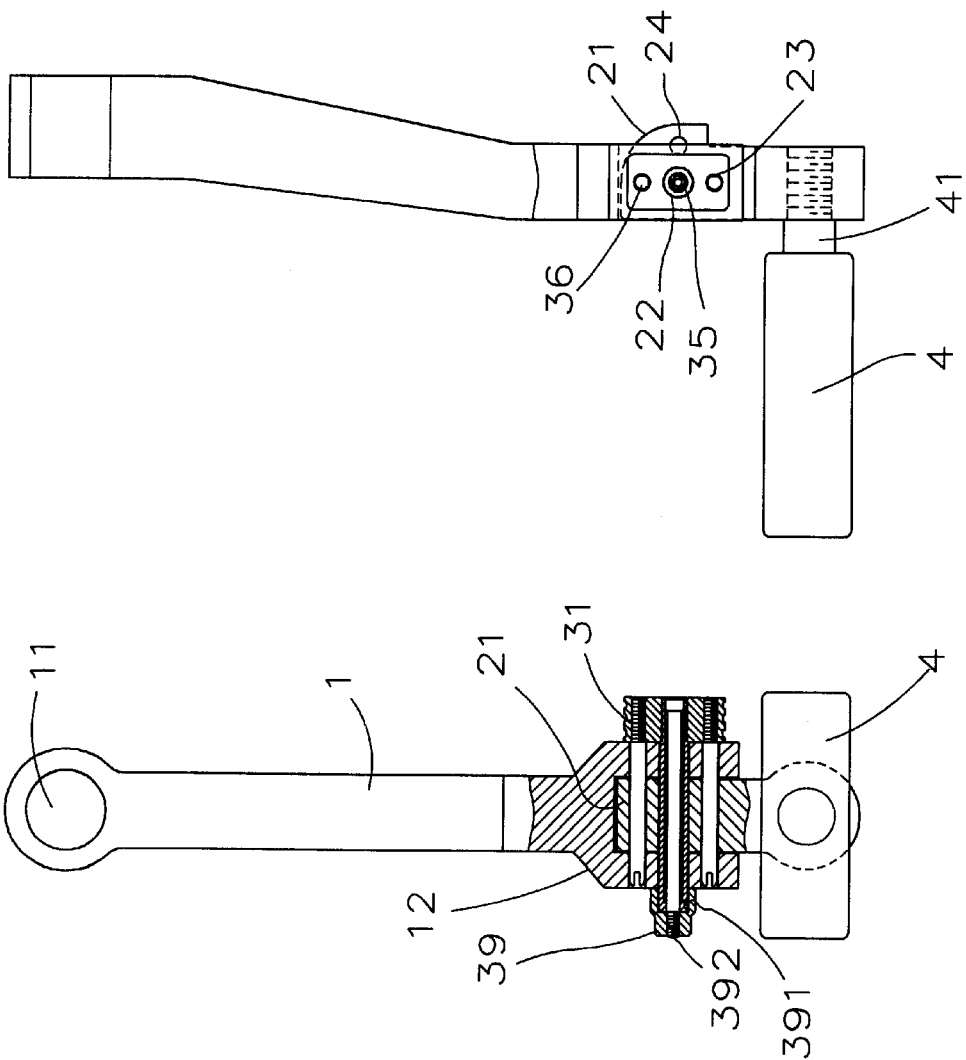
FIG. 5 is a schematic illustration of the present invention when not folded.

As shown in FIGS. 1 and 2, the foldable bicycle pedal crank of the present invention mainly comprises: a crank 1; a crank endpiece 2; a lock 3; and a pedal 4. The crank has a static end connected to a bicycle frame by a connecting hole 11, as shown in FIG. 5, and a far end with a connecting yoke 12. The connecting yoke 12 has a central indentation 13 for taking in the crank endpiece 2. A first crank hole 14 and two second crank holes 15 on two sides of the first crank hole 14 are bored through the connecting yoke 12, aiming across the indentation 13, and have widened end segments 141, 151. The crank endpiece 2 has an insertion part 21, inserted in the indentation 13. A first hole 22, two second holes 23 and a third hole 24 are bored through the insertion part 21. The two second holes 23 are placed on two opposite sides of the first hole 22. The third hole 24 is placed at a third side of the first hole 22 perpendicular thereto. The first, second and third holes 22, 23, 24 have widened end segments 221, 231, 241, respectively. The insertion part 21 has a curved top side 25, allowing to turn the insertion part 21 within the indentation 13. On a far end, opposite to the insertion part 21, a connecting hole 26 is bored through the crank endpiece 2, perpendicularly oriented to the first hole 22 and allowing to fasten the pedal 4. The lock 3 comprises a lock body 31, a first bolt 35 and two second bolts 36. A first threaded hole 32 and two second threaded holes 33 on two sides of the first threaded hole 32 are bored through the lock body 31. The lock body 31 has an outer grooved surface 34 with peripheral grooves for easy gripping and pulling thereof. The two second bolts 36 are placed on two sides of the first bolt 35. The first and second bolts 35, 36 have threaded outer ends 351, 361 which are screwed into the first and second threaded holes 32, 33, respectively, as shown in FIG. 3. Furthermore, the first and second bolts 35, 36 have inner ends 354, 364 that fit into the widened end segments 221, 231, 241 of the first, second and third holes 22, 23, 24. The first bolt 35 is a hollow body, enclosing a space 352 that is limited by a step 353. A rod 37 is inserted in the space 352 having an outer end with a head 371 and an inner threaded end 372. The head 371 and the space 352 have equal diameters. A hexagonal hole 373 is cut into the head 371. A spring 38 is laid around the rod 37, leaning against the step 353 and, opposite thereto, against the head 371. The second bolts 36 on the inner ends thereof have slits 362, allowing to screw the second bolts 36 into the second threaded holes 32. A nut 39 is set on the rod 37, having a cavity 391 and a thread 392. The cavity 391 takes in the inner end of the first bolt 35, while the thread 392 engages with the threaded end 372 of the rod 37. The pedal 4 has a connecting rod 41 which passes through the connecting hole 26 of the crank endpiece 2.

For assembling the foldable bicycle pedal crank of the present invention, the first and second bolts 35, 36 of the lock 3 are respectively inserted into the first and second crank holes 14, 15 of the crank 1 and put through the first and second holes 22, 23 of the crank endpiece 2. The nut 39 is screwed tight on the threaded end 372 of the rod 37, finishing assembly.

Figure 4:
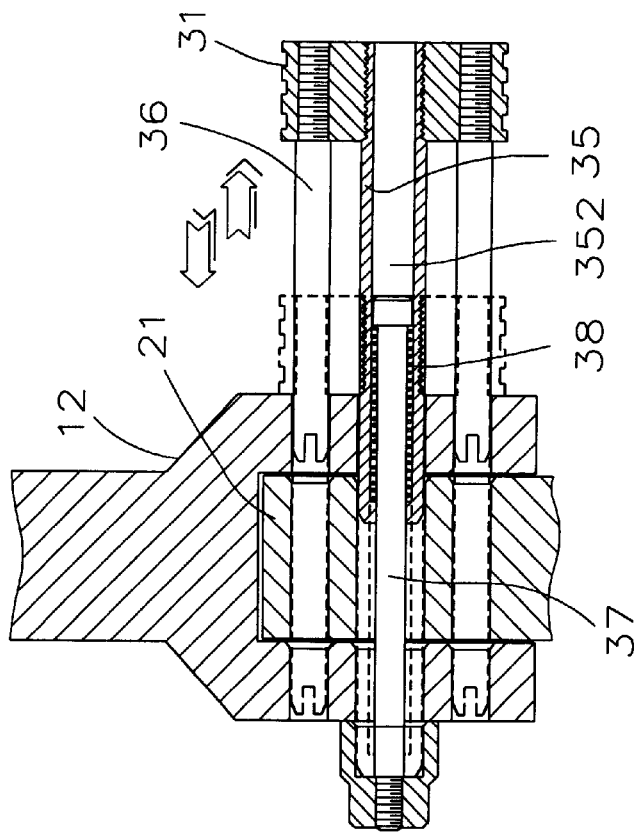
FIG. 4 is a schematic illustration of using the present invention.
Figure 6:
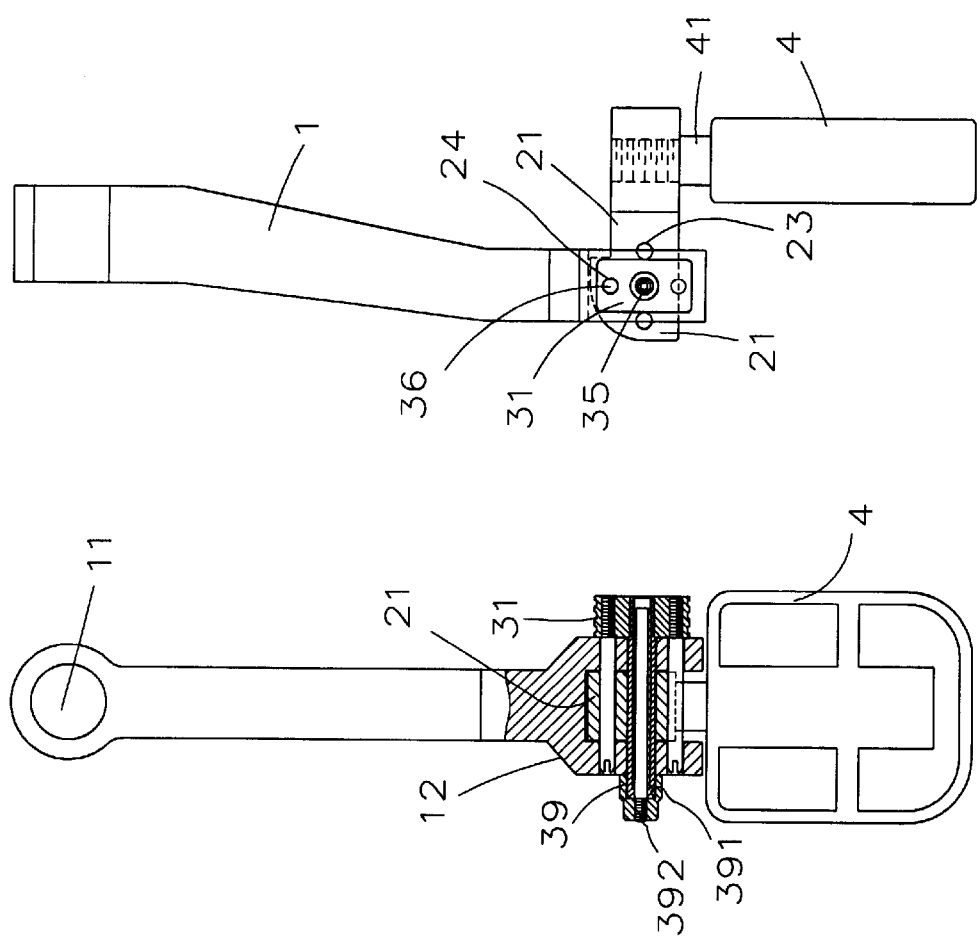
FIG. 6 is a schematic illustration of the present invention when folded.

Referring now to FIGS. 4 and 5, for folding up the pedal 4, the lock body 31 is pulled outward, as indicated in FIG. 4. Accordingly, the first and second bolts 35, 36 move along, with the second bolts 35 leaving the indentation 13, allowing the crank endpiece 2 to be turned with the rod 37 as an axis. Since the rod 37 is held back by the nut 39, the first bolt is shifted relative to the rod 37, compressing the spring 38. At this time the crank endpiece 2 is free to be turned around the rod 37. Turning thereof by 90 degrees and releasing the lock body 31 causes the spring 38 to drive the bolt 35 back into the first hole 22, with one of the second bolts 36 entering the third hole 24, as shown in FIG. 6. In this state, the crank endpiece 2 is locked again, with the pedal moved into empty space of the bicycle frame. Since the inner ends 354, 364 of the first end second bolts 35, 36 fit into the widened end sections 221, 231, 241 of the first, second and third holes 22, 23, 24, pushing back of the first end second bolts 35, 36 proceeds smoothly. Furthermore, the first bolt 35 has a length that ensures that, when the lock body 31 is pulled outward, the first bolt 35 does not leave the first hole 22 and the insertion part 21, so that one of the second bolts 36 is readily pushed into the third hole 24.

The present invention allows by pulling out and releasing the lock 3 conveniently to turn and fix again the crank endpiece 2 for folding the pedal 4 into a most preferable position in which the bicycle has no excessive width and in which empty space between the crank and the bicycle frame is taken advantage of. Thus a maximum effect of minimizing volume is achieved.

While the invention has been described with reference to a preferred embodiment thereof, it is to be understood that modifications or variations may be easily made without departing from the spirit of this invention which is defined by the appended claims.

What is claimed is:

1. A foldable bicycle pedal crank, comprising:
    a crank with a connecting yoke at a distal end, said yoke comprises a first crank hole and second crank holes passing therethrough,
    a crank endpiece comprising an insertion part that is received in said yoke, said crank endpiece having a first hole, second holes, and a third hole passing through said insertion part,
    a pedal connected to said crank endpiece, and
    a lock; wherein said lock comprises
        a lock body comprising a first threaded hole and second threaded holes,
        at least one hollow first bolt which has an outer end connected to said lock body, an inner space of said first bolt towards an inner end comprises a limiting step, and said inner space accommodates a rod that passes through said first bolt and is fixed in position, with a spring surrounding said rod, abutting said limiting step,
        second bolts which have outer ends connected to said lock body,
        said first and second bolts having threads on said outer ends thereof, said threads engaging said first and second threaded holes.

2. The foldable bicycle pedal crank according to claim 1, wherein:
    said crank on a static end opposite said distal end has a connecting hole to attach said crank to a bicycle frame.

3. The foldable bicycle pedal crank according to claim 1, wherein:
    said second crank holes are located at opposing sides of said first crank hole.

4. The foldable bicycle pedal crank according to claim 1, wherein:
    said second holes of said crank endpiece are located at opposing sides of said first hole of said crank endpiece.

5. The foldable bicycle pedal crank according to claim 1, wherein:
    said third hole of said crank endpiece is placed to one side of a line passing through said first hole and said second holes of said crank endpiece.

6. The foldable bicycle pedal crank according to claim 1, wherein:
    said crank endpiece has a curved top side, allowing said crank endpiece to rotate in said yoke.

7. The foldable bicycle pedal crank according to claim 1, wherein:
    said rod includes a threaded portion that extends through said first bolt, said threaded portion allowing said rod to be secured by a nut.

8. The foldable bicycle pedal crank according to claim 7, wherein:
    said nut has a cavity to receive said inner end of said first bolt.

9. The foldable bicycle pedal crank according to claim 1, wherein:
    said crank endpiece at an end opposite said insertion part has a connecting hole to receive said pedal.

10. The foldable bicycle pedal crank according to claim 1, wherein:
    said lock body has an outer side with peripheral grooves to provide a gripping surface for manually pulling and pushing said lock.

11. The foldable bicycle pedal crank according to claim 1, wherein:
    said rod has a head, said spring being positioned between said head and said limiting step of said first bolt.

12. The foldable bicycle pedal crank according to claim 11, wherein:
    said head of said rod comprises a hole.

13. The foldable bicycle pedal crank according to claim 1, wherein:
    slots are cut into inner ends of said second bolts, said slots facilitating rotation of said second bolts.

14. The foldable bicycle pedal crank according to claim 1, wherein:
    said pedal has a connecting rod that is received in said connecting hole of said crank endpiece.

15. The foldable bicycle pedal crank according to claim 1, wherein:
    said first, second, and third holes of said crank endpiece have widened end segments.

16. The foldable bicycle pedal crank according to claim 1, wherein:
    said first and second crank holes have widened end segments.

17. A foldable bicycle pedal crank, comprising:
    a crank with a connecting yoke at a distal end, said yoke comprises a first crank hole and second crank holes passing therethrough,
    a crank endpiece comprising an insertion part that is received in said yoke, said crank endpiece having a first hole, second holes, and a third hole passing through said insertion part,
    a pedal connected to said crank endpiece, and
    a lock; wherein said lock comprises
        a lock body,
        at least one hollow first bolt which has an outer end connected to said lock body, an inner space of said first bolt towards an inner end comprises a limiting step, and said inner space accommodates a rod that passes through said first bolt and is fixed in position, with a spring surrounding said rod, abutting said limiting step, said rod includes a threaded portion that extends through said first bolt, said threaded portion allowing said rod to be secured by a nut, said nut including a cavity to receive said inner end of said first bolt, and second bolts which have outer ends connected to said lock body.

18. The foldable bicycle pedal crank according to claim 17, wherein:

said crank on a static end opposite said distal end has a connecting hole to attach said crank to a bicycle frame.

19. The foldable bicycle pedal crank according to claim 17, wherein:

said second crank holes are located at opposing sides of said first crank hole.

20. The foldable bicycle pedal crank according to claim 17, wherein:

said second holes of said crank endpiece are located at opposing sides of said first hole of said crank endpiece.

21. The foldable bicycle pedal crank according to claim 17, wherein:

said third hole of said crank endpiece is placed to one side of a line passing through said first hole and said second holes of said crank endpiece.

22. The foldable bicycle pedal crank according to claim 17, wherein:

said crank endpiece has a curved top side, allowing said crank endpiece to rotate in said yoke.

23. The foldable bicycle pedal crank according to claim 17, wherein:

said crank endpiece at an end opposite said insertion part has a connecting hole to receive said pedal.

24. The foldable bicycle pedal crank according to claim 17, herein:

said lock body has an outer side with peripheral grooves to provide a gripping surface for manually pulling and pushing said lock.

25. The foldable bicycle pedal crank according to claim 17, wherein:

said rod has a head, said spring being positioned between said head and said limiting step of said first bolt.

26. The foldable bicycle pedal crank according to claim 25, wherein:

said head of said rod comprises a hole.

27. The foldable bicycle pedal crank according to claim 17, wherein:

slots are cut into inner ends of said second bolts, said slots facilitating rotation of said second bolts.

28. The foldable bicycle pedal crank according to claim 17, wherein:

said pedal has a connecting rod that is received in said connecting hole of said crank endpiece.

29. The foldable bicycle pedal crank according to claim 17, wherein:

said first, second, and third holes of said crank endpiece have widened end segments.

30. The foldable bicycle pedal crank according to claim 17, wherein:

said first and second crank holes have widened end segments.

* * * * *